3,300,465
POLYMERIZATION CATALYST CONTAINING AN ORGANOSILAZANE
John W. Bayer, Perrysburg, and Edgardo Santiago, Toledo, Ohio, assignors to Owens-Illinois Glass Company, a corporation of Ohio
No Drawing. Filed Sept. 30, 1963, Ser. No. 312,360
29 Claims. (Cl. 260—93.7)

The present invention relates to catalysts and methods for olefin polymerization. One aspect of this invention relates to polymerization catalysts which comprise an organosilazane and a heavy metal halide; a second aspect relates to polymerization catalysts which comprise a Ziegler catalyst system plus an organosilazane; a third aspect relates to the method of polymerization with these catalysts.

The addition of triethylaluminum to a heptane solution of titanium tetrachloride causes formation of a brown-black precipitate which consists mainly of reduced titanium chlorides; the precipitate and supernate catalyze the low pressure polymerization of many alpha-olefins. This important discovery by Karl Ziegler was reported in Belgian Patent 533,362 (1954), which disclosed catalysts prepared by interaction of a trialkylaluminum with a compound of a metal from group IV–B, V–B, or VI–B of the periodic table, including thorium and uranium. The basic Ziegler method was subsequently expanded by many workers, particularly Natta et al., to include preparation of highly linear and often stereoregular polymers of high molecular weight from a wide variety of alpha-olefins. Application of these processes to monosubstituted ethylenes provides polymers which possess tertiary asymmetric carbon atoms. If these asymmetric centers have the same steric configuration, at least for long portions of the chain, the polymer is said to be isotactic; if the asymmetric carbon atoms alternate in configuration, the polymer is syndiotactic; and if the asymmetric arrangement is random, the polymer is atactic. The terms Ziegler catalyst and Ziegler process are applied generically to compositions and procedures which broadly resemble those discovered by Ziegler. The reported variations of the basic concept are too diverse to be susceptible to concise summary, but the majority of important Ziegler catalysts are encompassed in the definition of a catalyst system which contains (a) a compound, usually a halide or ester, of a transition metal from group IV, V, or VI of the periodic chart, and (b) a compound of the formula ZMX$_y$, where Z represents an aryl or alkyl radical, M represents a metal atom from group I, II, or III, X represents a halogen atom or an alkoxy radical, and y represents an integer less than the oxidation state of M. We have now discovered that an organosilazane can be used to replace the metal alkyl of conventional Ziegler catalysts. We have further discovered that partial replacement of certain metal alkyls by organosilazanes provides olefin polymerization catalysts with enhanced productivity.

It is therefore an object of the present invention to provide new olefin polymerization catalysts.

It is another object of this invention to provide a catalyst system of the Ziegler type in which the usual metal alkyl is replaced by an organosilazane.

It is a further object of this invention to provide a catalyst system of the Ziegler type in which the usual metal alkyl is partially substituted by an organosilazane.

It is a still further object of this invention to provide a method for polymerization of olefins by means of new and novel catalyst systems.

These and other objects and advantages of the present invention will be apparent from the following disclosure and claims.

According to the present invention, there is provided a catalyst system which consists essentially of: (A) a compound of the formula TiX$_n$, where X represents a halogen atom with atomic number greater than 16, and $n$ is 2, 3, or 4; and (B) a compound selected from the group of compounds of the formulas

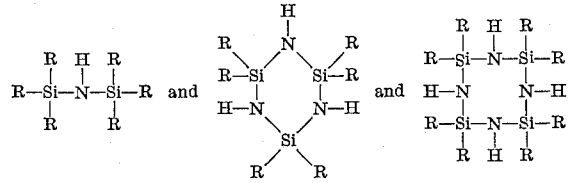

where each R represents a radical independently selected from the group which consists of alkyl radicals with less than five carbon atoms. A further aspect of this invention provides a method for polymerization which comprises contacting an olefin with a catalyst system of the type just described.

Examples of compounds of the formula TiX$_n$ as defined above are titanium dichloride, titanium trichloride, titanium tetrachloride, titanium tribromide, titanium tetrabromide, titanium triiodide, and titanium tetraiodide.

In the definitions of compounds of the formulas

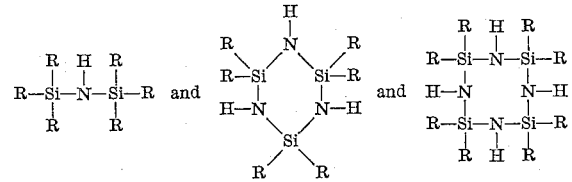

above (hereafter referred to generically as organosilazanes) the term alkyl radical with less than five carbon atoms refers to a radical whose formula can be derived by omitting the symbol for one hydrogen atom from the formula for a saturated, acyclic hydrocarbon which contains from one to four carbon atoms. Examples of organosilazanes so defined are hexamethyldisilazane, hexaethyldisilazane, trimethylsilyltriethylsilylamine, di(methyldiethylsilyl)amine, triisopropylsilyltri-n-butylsilylamine, di(tri-sec-butylsilyl)amine, hexamethylcyclotrisilazane, hexaethylcyclotrisilazane, 2,2,4,4-tetramethyl-6,6-diethylcyclotrisilazane, hexa-sec-butylcyclotrisilazane, octamethylcyclotetrasilazane, octaethylcyclotetrasilazane, 2,2,4,4-tetramethyl-6,6,8,8-tetraethylcyclotetrasilazane, and octa-n-butylcyclotetrasilazane.

In a usual embodiment of the present invention, there is provided a catalyst system which consists essentially of: (A) a compound of the formula TiX$_n$ as previously defined, and (B) hexamethyldisilazane. In a further usual embodiment of this invention, there is provided a catalyst system which consists essentially of: (A) a compound of the formula TiX$_n$ as previously defined, and (B) hexamethylcyclotrisilazane. A still further usual embodiment of this invention provides a catalyst system which consists essentially of: (A) a compound of the formula TiX$_n$ as previously defined, and (B) octamethylcyclotetrasilazane. A usual embodiment of this invention also provides a method for polymerization which comprises contacting an alpha-olefin with a catalyst system of the type just described in a hydrocarbon medium.

According to a further aspect of the present invention, there is provided a catalyst system which consists essentially of: (A) a compound of the formula TiX$_n$ as previously defined; (B) a compound selected from the group of compounds of the formulas

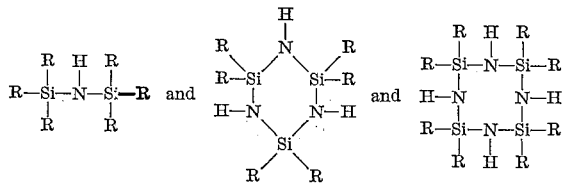

as previously defined; and (C) a compound of the formula

where each R and X independently has the meaning hereinbefore assigned. A still further aspect of this invention provides a method for polymerization which comprises contacting an olefin with a catalyst system of the type just described.

According to a preferred embodiment of the present invention, there is provided a catalyst system which consists essentially of: (A) a compound of the formula $TiCl_n$, where $n$ has the meaning already assigned; (B) hexamethyldisilazane; and (C) diethylaluminum chloride. A further preferred embodiment of this invention provides a catalyst system which consists essentially of: (A) a compound of the formula $TiCl_n$, where $n$ has the meaning already assigned; (B) hexamethylcyclotrisilazane; and (C) diethylaluminum chloride. A still further preferred embodiment of this invention provides a catalyst system which consists essentially of: (A) a compound of the formula $TiCl_n$, where $n$ has the meaning already assigned; (B) octamethylcyclotetrasilazane; and (C) diethylaluminum chloride. A further preferred aspect provides a method for polymerization which comprises contacting an alpha-olefin with a catalyst system of the type just described in a hydrocarbon medium.

It is also within the purview of this invention to add a Lewis acid, particularly aluminum chloride, to the polymerization medium to increase the effectiveness of the catalyst system, and to provide two or more olefinic monomers in order to obtain copolymers.

Materials which are polymerized in accordance with the present invention are, broadly, organic monomers which contain an ethylenic linkage, including olefins. The method of this invention is especially useful when applied to olefins which contain at least one terminal double bond. The olefinic hydrocarbons most preferred are 1-monoolefins which contain two to ten carbon atoms per molecule. In particular, ethylene can be rapidly polymerized to a tough, solid polymer upon being contacted with a catalyst of this invention at mild temperatures and low pressures; the resultant products generally have high densities. Examples of other suitable olefins are propylene, 1-butene, 1-pentene, 1-hexene, 1-heptene, 1-octene, and 1-decene. Examples of branched chain olefins are 3-methyl-1-pentene, 3-methyl-1-butene, 4-methyl-1-pentene, and 4,4-dimethyl-1-pentene. Examples of di- and poly-unsaturated olefins include butadiene, 1,5-hexadiene, 1,4-pentadiene, 1,4,7-octatriene, 2-methyl-1,3-butadiene, 2-methyl-1,3-pentadiene, 2,3-dimethyl-1,3-pentadiene, 2-methyl-3-ethyl-1,3-pentadiene, and 1,4,6-trimethyl-1,5-hexadiene. Other olefinic compounds useful in the present process include styrene, alpha-methylstyrene, vinylcyclohexane, cyclopentadiene, allylbenzene, and allylcyclohexane. Examples of non-hydrocarbon monomers include chloroprene, 2-methoxybutadiene, methyl acrylate, methyl methacrylate, vinyl chloride, vinyl acetate, 2-methyl-5-vinylpyridine, 4-vinylpyridine, and 2-vinylpyridine.

According to the present invention we have discovered that replacement of part of a compound of the formula $R_2AlX$ as previously defined with an equimolar portion of a compound selected from the group which consists of those represented by the formulas

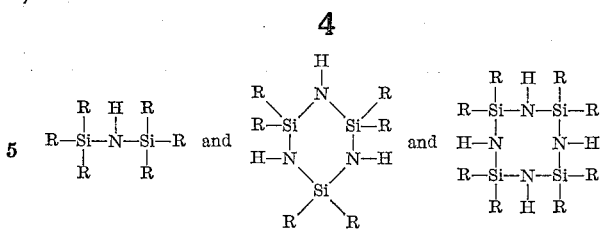

as previously defined results in an unexpectedly enhanced yield of polymer. This synergistic effect, as shown in the following examples, is illustrated by comparison of the yields from reactions of three types:

A. A reaction in which a conventional Ziegler system of the type $R_2AlX$ plus $TiCl_n$, is used to polymerize an olefin;

B. A reaction in which the $R_2AlX$ of the conventional Ziegler system is completely replaced by an equimolar quantity of an organosilazane; and C. A reaction in which part of the $R_2AlX$ component of the conventional Ziegler system is replaced by an equimolar portion of an organosilazane.

In each instance the yield from reaction C is greater than that from either A or B, indicating that the effect of partial replacement of $R_2AlX$ by an organosilazane is unexpectedly able to increase yield more than additively.

In the experiments which correspond to the following specific examples, organosilazanes were commercial materials which were carefully purified immediately before use, and introduced into the reaction vessel by means which excluded contact with air.

The titanium trichloride was an anhydrous, purple, crystalline material sealed in 0.2-gram quantities in individual ampules in a nitrogen atmosphere, and was obtained from the Anderson Chemical Division of the Stauffer Chemical Company; it was introduced into the reaction vessel by means which excluded contact with air. Heptane was carefully purified and dried before use, and was transferred to the reaction vessel in a nitrogen atmosphere. High purity ethylene was also employed, and was carefully further purified immediately before use.

The reaction vessel was a 1-liter round bottom flask equipped with a side arm and a thermowell containing a thermocouple attached to an automatic temperature recorder; the flask was mounted in a heating mantle controlled by a variable transformer. The reaction vessel was shaken by means of a mechanical shaker applied throughout the reaction time. Gaseous monomers were continuously introduced into the reaction vessel so as to maintain pressures in most cases in the range from 20 to 25 p.s.i.g., as indicated in the examples.

The samples of polymer prepared by the methods of the following examples were, after the workup procedure described, dried at 60–70° C. under reduced pressure, and then compression molded into films at 240° C. under a pressure of about 10,000 p.s.i. A small portion of a three-mil film thus prepared was placed between glass plates on a Fischer-Johns melting point apparatus, and a melting range was determined as the temperature at which further clearing ceased. The remainder of the three-mil film was submitted for infrared analysis. A ten-mil film similarly prepared was subjected to a modification of the ASTM–762–60T procedure for determination of density. Densities were determined at 23° C. The solid polymers produced by the method of this invention are useful for making articles such as bottles, bowls, pails, etc. Liquid and soft polymers can be used as rubber plasticizers, plasticizers for organic plastics, as caulking compounds, etc.

*Example 1.—Hexamethyldisilazane and titanium trichloride*

A. In the reaction vessel of the apparatus previously described were placed 300 ml. of purified heptane, 0.5 gram of titanium trichloride, and 0.41 ml. of diethylaluminum chloride. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 57° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The polymer yield was 14.7 grams; the product has a melting point of 185° C., and a density of 0.946 grams per cubic centimeter.

B. The procedure of Example 1A was repeated, except that an equimolar portion of hexamethyldisilazane was substituted for the diethylaluminum chloride therein described. A polymeric product was obtained in a yield of less than 1 gram. A second run using the same catalyst system with the addition of 0.25 gram of aluminum chloride gave similar results.

C. The procedure of Example 1A was repeated, except that 0.30 ml. of hexamethyldisilazane and 0.27 ml. of diethylaluminum chloride were substituted for the diethylaluminum chloride therein described. The product polymer, after the workup procedure of the cited example, weighed 23.2 grams; its melting point was 198° C., and its density was 0.937 gram per cubic centimeter. A second run using 0.60 ml. of hexamethyldisilazane and 0.13 ml. of diethylaluminum chloride in place of the diethylaluminum chloride of Example 1A resulted in a polymer yield of 22.3 grams; the product's melting point was 198° C., and its density was 0.933 grams per cubic centimeter. Thus it is apparent that the combined catalyst system in which hexamethyldisilazane and diethylaluminum chloride are used in conjunction with titanium trichloride is substantially superior in productivity to either of the control reactions described in Examples 1A and 1B.

*Example 2.—Hexamethylcyclotrisilazane and titanium trichloride*

A. In the reaction vessel of the apparatus previously described were placed 300 ml. of purified heptane, 0.5 gram of titanium trichloride, and 0.41 ml. of diethylaluminum chloride. The mixture thus obtained was heated under a nitrogen atmosphere with shaking to 57° C., whereupon the nitrogen blanket was replaced by ethylene maintained at a pressure of 20 p.s.i.g. The mixture was heated with agitation at about 57° C. for about two hours, and then allowed to cool to room temperature. To the resultant mixture was added 500 ml. of a 4:3 mixture of isopropyl alcohol and methanol, the polymer was removed by filtration, suspended in 100 ml. of 4:1 isopropyl alcohol:water, and again separated by filtration. By repetition of this procedure the polymer was washed a second time with isopropyl alcohol-water and then with acetone, and then dried in a vacuum oven at about 60° to 70° C. under a slightly subatmospheric pressure. The polymer yield was 17.6 grams; the product has a melting point of 170° C., and a density of 0.944 gram per cubic centimeter.

B. The procedure of Example 2A was repeated, except that an equimolar portion of hexamethylcyclotrisilazane was substituted for the diethylaluminum chloride therein described. A polymeric product was obtained in a yield of less than 1 gram. A second run using the same catalyst system with the addition of 0.25 gram of aluminum chloride gave similar results.

C. The procedure of Example 1A was repeated, except that 0.30 ml. of hexamethylcyclotrisilazane and 0.27 ml. of diethylaluminum chloride were substituted for the diethylaluminum chloride therein described. The product polymer, after the workup procedure of the cited example, weighed 23.2 grams; its melting point was 202° C., and its density was 0.934 gram per cubic centimeter. A second run using 0.60 ml. of hexamethylcyclotrisilazane and 0.13 ml. of diethylaluminum chloride in place of the diethylaluminum chloride of Example 2A resulted in a polymer yield of 20.7 grams; the product's melting point was 206° C., and its density was 0.941 gram per cubic centimeter. Comparison of yields from reactions described in Examples 2A-C indicated that the combined catalyst system of Example 2C results in a substantially increased yield over that provided by either of the control catalyst systems.

It will be evident that modifications of this invention can be made without departing from the spirit and scope of this disclosure or the scope of the following claims.

We claim:

1. As a composition of matter, a catalyst which consists essentially of:
   (A) a compound of the formula $TiX_n$, where X represents a halogen atom with atomic number greater than 16, and $n$ is 2, 3, or 4; and
   (B) a compound selected from the group of compounds of the formulas

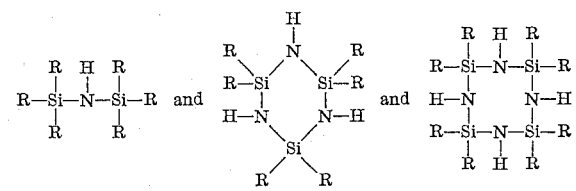

where each R represents a radical independently selected from the group which consists of alkyl radicals with less than five carbon atoms.

2. As a composition of matter, a catalyst which consists essentially of:
   (A) a compound of the formula $TiX_n$, where X represents a halogen atom with atomic number greater than 16, and $n$ is 2, 3, or 4; and
   (B) hexamethyldisilazane.

3. As a composition of matter, a catalyst which consists essentially of:
   (A) a compound of the formula $TiX_n$, where X represents a halogen atom with atomic number greater than 16, and $n$ is 2, 3, or 4; and
   (B) hexamethylcyclotrisilazane.

4. As a composition of matter, a catalyst which consists of titanium trichloride and hexamethyldisilazane.

5. As a composition of matter, a catalyst which consists of titanium trichloride and hexamethylcyclotrisilazane.

6. A method of polymerization which comprises contacting an olefin with a catalyst which consists essentially of:
   (A) a compound of the formula $TiX_n$, where X represents a halogen atom with atomic number greater than 16, and $n$ is 2, 3, or 4; and
   (B) a compound selected from the group of compounds of the formulas

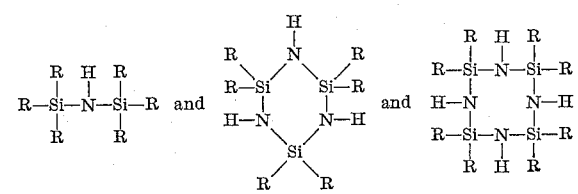

where each R represents a radical independently selected from the group which consists of alkyl radicals with less than five carbon atoms.

7. As a composition of matter, a catalyst which consists essentially of:
(A) a compound of the formula $TiX_n$, where X represents a halogen atom with atomic number greater than 16, and $n$ is 2, 3, or 4;
(B) a compound selected from the group of compounds of the formulas

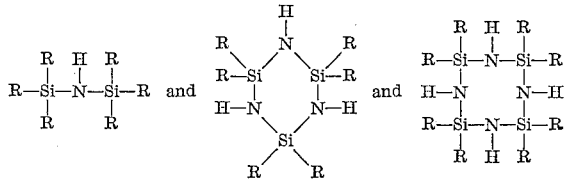

where each R represents a radical independently selected from the group which consists of alkyl radicals with less than five carbon atoms; and
(C) a compound of the formula

where each R represents a radical independently selected from the group which consists of alkyl radicals with less than five carbon atoms, and X represents a halogen atom with atomic number greater than 16.

8. As a composition of matter, a catalyst which consists essentially of:
(A) a compound of the formula $TiCl_n$, where $n$ is 2, 3, or 4;
(B) hexamethyldisilazane; and
(C) diethylaluminum chloride.

9. As a composition of matter, a catalyst which consists essentially of:
(A) a compound of the formula $TiCl_n$, where $n$ is 2, 3, or 4;
(B) hexamethylcyclotrisilazane; and
(C) diethylaluminum chloride.

10. As a composition of matter, a catalyst which consists essentially of:
(A) a compound of the formula $TiCl_n$, where $n$ is 2, 3, or 4;
(B) octamethylcyclotetrasilizane; and
(C) diethylaluminum chloride.

11. As a composition of matter, a catalyst which consists of titanium trichloride, hexamethyldisilazane, and diethylaluminum chloride.

12. As a composition of matter, a catalyst which consists of titanium trichloride, hexamethylcyclotrisilazane, and diethylaluminum chloride.

13. As a composition of matter, a catalyst which consists of titanium trichloride, octamethylcyclotetrasilazane, and diethylaluminum chloride.

14. A method of polymerization which comprises contacting an olefin with a catalyst which consists essentially of:
(A) a compound of the formula $TiX_n$, where X represents a halogen atom with atomic number greater than 16, and $n$ is 2, 3, or 4;
(B) a compound selected from the group of compounds of the formulas

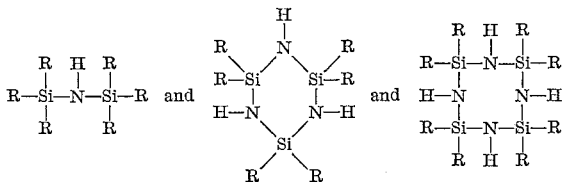

where each R represents a radical independently selected from the group which consists of alkyl radicals with less than five carbon atoms; and (C) a compound of the formula

where each R represents a radical independently selected from the group which consists of alkyl radicals with less than five carbon atoms, and X represents a halogen atom with atomic number greater than 16.

15. A method of polymerization which comprises contacting an olefin with a catalyst which consists essentially of:
(A) a compound of the formula $TiCl_n$, where $n$ is 2, 3, or 4;
(B) hexamethyldisilazane; and
(C) diethylaluminum chloride.

16. A method of polymerization which comprises contacting a terminally unsaturated olefin with a catalyst which consists essentially of:
(A) a compound of the formula $TiCl_n$, where $n$ is 2, 3, or 4;
(B) hexamethylcyclotrisilazane; and
(C) diethylaluminum chloride.

17. A method of polymerization which comprises contacting a terminally unsaturated olefin with a catalyst which consists essentially of:
(A) a compound of the formula $TiCl_n$, where $n$ is 2, 3, or 4;
(B) octamethylcyclotetrasilazane; and
(C) diethylaluminum chloride.

18. A method of polymerization which comprises contacting a terminally unsaturated olefin with a catalyst which consists of titanium trichloride, hexamethyldisilazane, and diethylaluminum chloride.

19. A method of polymerization which comprises contacting a terminally unsaturated olefin with a catalyst which consists of titanium trichloride, hexamethylcyclotrisilazane, and diethylaluminum chloride.

20. A method of polymerization which comprises contacting an organic monomer containing an ethylenic linkage with a catalyst which consists essentially of:
(A) a compound of the formula $TiX_n$, where X represents a halogen atom with atomic number greater than 16, and $n$ is 2, 3, or 4; and
(B) a compound selected from the group of compounds of the formulas

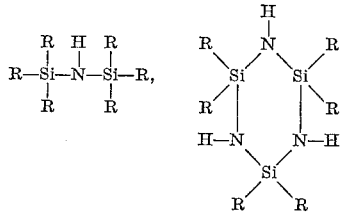

and

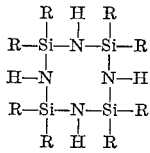

where each R represents a radical independently selected from the group which consists of alkyl radicals with less than five carbon atoms.

21. A method of claim 20, wherein said organic monomer is a polyunsaturated olefin.

22. A method of claim 20, wherein said polyunsaturated olefin is a diolefin.

23. A method of claim 20, wherein said monomer is an alpha olefin containing from 2 to 10 carbon atoms.

24. A method of claim 20, wherein said monomer is ethylene.

25. A method of polymerization which comprises contacting an organic monomer containing an ethylenic linkage with a catalyst which consists essentially of:
(A) a compound of the formula $TiX_n$, where X represents a halogen atom with atomic number greater than 16, and $n$ is 2, 3, or 4;
(B) a compound selected from the group of compounds of the formulas

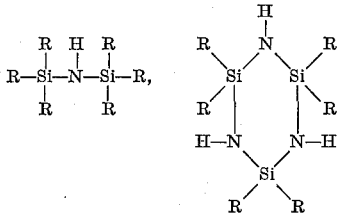

and

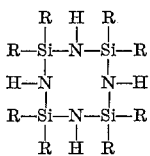

where each R represents a radical independently selected from the group which consists of alkyl radicals with less than five carbon atoms; and
(C) a compound of the formula

where each R represents a radical independently selected from the group which consists of alkyl radicals with less than five carbon atoms, and X represents a halogen atom with atomic number greater than 16.

26. A method of claim 25, wherein said organic monomer is a polyunsaturated olefin.

27. A method of claim 26, wherein said polyunsaturated olefin is a diolefin.

28. A method of claim 25, wherein said monomer is an alpha olefin containing from 2 to 10 carbon atoms.

29. A method of claim 25, wherein said monomer is ethylene.

References Cited by the Examiner
UNITED STATES PATENTS
3,196,137   7/1965   Cain _____ 260—93.7

JOSEPH L. SCHOFER, *Primary Examiner.*
M. B. KURTZMAN, *Assistant Examiner.*